United States Patent [19]

Ohuchi

[11] Patent Number: 4,903,012

[45] Date of Patent: Feb. 20, 1990

[54] COORDINATE SYSTEM INPUT DEVICE PROVIDING REGISTRATION CALIBRATION AND A MOUSE FUNCTION

[75] Inventor: Junichi Ohuchi, Furukawa, Japan

[73] Assignee: Alps Electric Co., Ltd., Tokyo, Japan

[21] Appl. No.: 101,136

[22] Filed: Sep. 24, 1987

[30] Foreign Application Priority Data

Jan. 20, 1987 [JP] Japan .............................. 62-7058[U]
Jan. 20, 1987 [JP] Japan .............................. 62-7059[U]
Jan. 20, 1987 [JP] Japan .............................. 62-7060[U]

[51] Int. Cl.$^4$ .............................................. G09G 1/16
[52] U.S. Cl. .................................... 340/709; 340/712; 340/724
[58] Field of Search ................ 340/724, 712, 365 UL, 340/709, 706, 710

[56] References Cited

U.S. PATENT DOCUMENTS

| | | | |
|---|---|---|---|
| 4,464,655 | 8/1984 | Bird | 340/724 |
| 4,523,188 | 6/1985 | Huber | 340/724 |
| 4,698,626 | 10/1987 | Sato et al. | 340/709 |
| 4,710,758 | 12/1987 | Mussler | 340/712 |

Primary Examiner—Gerald Brigance
Attorney, Agent, or Firm—Guy W. Shoup; Brian D. Ogonowsky

[57] ABSTRACT

A coordinate system input device provides automatic calibration between coordinates detected and display coordinates and also provides a mouse function wherein movement of an object adjacent a display screen acts to move a displayed cursor an amount proportional to the movement of the object adjacent the display screen. In its automatic calibration function, the coordinate input device compares the coordinates of a displayed test cursor with the coordinates of a detected object adjacent the display screen and calculates a correction amount to correct subsequent detected coordinate positions. In its mouse function, the coordinate input device detects movement of an object adjacent the display screen and amplifies this movement to control a cursor displayed on the display screen. When the object is removed from the display screen, the procedure to be implemented, as indicated by the position of the cursor, is automatically initiated.

5 Claims, 8 Drawing Sheets

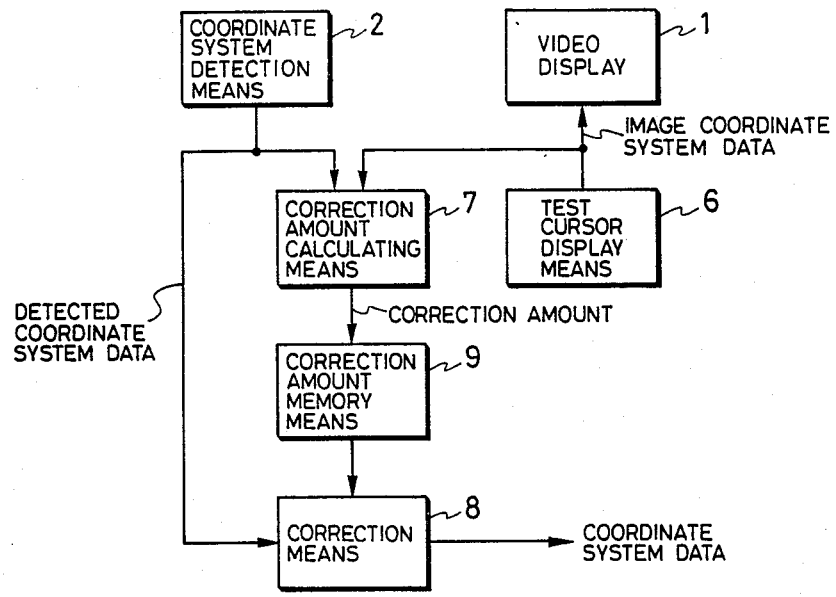
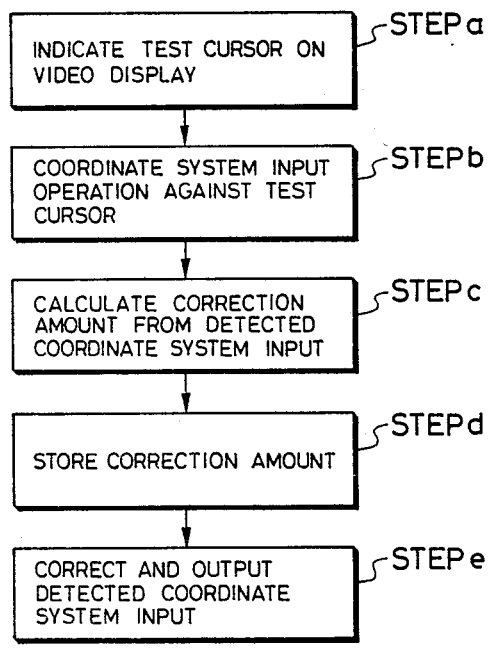

COORDINATE SYSTEM INPUT DEVICE PROVIDING REGISTRATION CALIBRATION AND A MOUSE FUNCTION

FIELD OF THE INVENTION

This invention relates to a coordinate system input device disposed on a front surface of an image display apparatus, and more particularly to an improvement ensuring highly accurate input operation.

BACKGROUND AND OBJECTS OF THE INVENTION

Coordinate system input devices are now coming into wide use where each coordinate input device comprises a coordinate system detection means called "touch sensor" of optical type or capacity measuring type disposed on a front surface of a video display such as CRT display or LCD, so that when a finger or other solid directly touches a video display screen exhibiting images, a coordinate system input operation against a host computer is effected.

Such coordinate system input devices disposed and used on a front surface of a display apparatus for a signal input operation are disclosed by U.S.A. Pat. Nos. 4,563,578; 4,558,313; 4,555,157; 4,553,842; 4,553,254; 4,542,375; 4,521,870; 4,520,357; 4,517,559; 4,511,760; 4,507,557; 4,476,463; 4,459,476; 4,423,299; 4,313,109; 4,055,726; 3,916,099 and others which uses various detection means.

In these prior art devices, it is required that a specific position of a cursor on the screen of the video display, according to image coordinate system data from a host computer accurately coincide with detected coordinate system data obtained from the coordinate system detection means upon a finger touch on the cursor. If the image coordinate system data of the cursor does not coincide with the detected coordinate system data, the host computer erroneously judges that a position other than that of the cursor was instructed by a user's finger, even when a user just touches the position of the cursor on the video display.

In this connection, the prior art technology involves a problem that the coordinate system detection means has to be disposed in accurate coincidence with the coordinate system axes of the video display in order to maintain coincidence between the image coordinate system data of an image indicated on the video display and the detected coordinate system data obtained from the coordinate system detection means.

It is therefore a first object of the invention to provide a coordinate system input device configured to correct the detected coordinate system data from the coordinate system detection means into a value corresponding to the image coordinate system data of an image indicated on the video display and to thereafter output the corrected value.

In the prior art device, the cursor moves following to a movement of a finger put on the cursor indicated on the video display. More specifically, the cursor is indicated on the video display in accordance with a detected coordinate system data of the finger obtained from the coordinate system detection means upon a coordinate system input operation.

However, the finger put on the cursor during a coordinate system input operation hides the cursor and makes it difficult for a user to readily recognize the position of the cursor. Additionally, in a large-scaled video display screen on which the cursor must move over a large distance, a large movement of a finger or other touching element is required, and this decreases the operability of the device.

It is therefore a second object of the invention to provide a coordinate system input device configured to move the cursor on the video display in a mouse mode by coordinate system input operation against the screen other than the cursor.

A third object of the invention is to provide a coordinate system input device configured to move the cursor on the video display in a mouse mode by a coordinate system input operation against the screen other than the cursor and to commence a procedure according to the cursor coordinate system data upon completion of coordinate system input operation.

SUMMARY OF THE INVENTION

In order to solve the technical problems indicated above, the invention provides a coordinate system input device comprising:

a display appratus;

a coordinate system detector disposed on a front surface of a display screen to detect an instruction operation position according to display information of said display apparatus and produce detected coordinate system data;

a cursor generating means causing an index to appear at a specific position on the display screen of said display apparatus;

a memory means for storing a coordinate system position to be displayed at present by said cursor generating means;

a calculating means for calculating a correction amount based on coordinate system position data stored in said memory means and a detected coordinate system data from said coordinate system detector; and a correction means responsive to an output from said calculating means to correct a signal applied to said coordinate system detector and/or said display apparatus.

An invention coordinate system input device directed specifically to the first technical problem comprises: a video display; a coordinate system detection means disposed on a front surface of said video display; a test cursor display means for indicating a test cursor on said video display; a correction amount calculating means for calculating a correction amount from a difference between detected coordinate system data obtained from said coordinate system detection means upon a coordinate system input operation against said test cursor and an image coordinate system data of said test cursor; a correction amount memory means for storing said correction amount; and a correction means for correcting the detected coordinate system data from said coordinate system detection means into a corrected value considering said correction amount and to output said corrected value.

An invention coordinate system input device directed specifically to the second technical problem comprises: a video display, a coordinate system detection means disposed on a front surface of said video display; an initial detected coordinate system memory means for storing an initial value of detected coordinate system data obtained from said coordinate system detection means upon a coordinate system input operation; a coordinate system movement amount calculating means for calculating a movement amount of a coordinate system input position from a difference between a detected coordinate system data obtained by moving a coordinate system input position in said coordinate system input operation and said initial value; a cursor movement amount setting means for setting a movement amount of a cursor indicated on said video display from said movement amount of a coordinate system input position; a cursor coordinate system memory means for indicating said cursor on said video display according to an initial cursor coordinate system data stored at the beginning of said coordinate system input operation and for storing cursor coordinate system data of the cursor indicated on said video display at the end of said coordinate system input operation; and a cursor coordinate system setting means for setting a new cursor position data from said cursor movement amount and said initial cursor coordinate system data and for indicating said cursor at a new position on said video display.

An invention coordinate system input device directed specifically to the third technical problem comprise: a video display; a coordinate system detection means disposed on a front surface of said video display; an initial detected coordinate system memory means for storing an initial value of a detected coordinate system data obtained from said coordinate system detection means upon a coordinate system input operation; a coordinate system movement amount calculating means for calculating a movement amount of a coordinate system input position from a detected coordinate system data obtained by moving the coordinate system input position in said coordinate system input operation and said initial value; a cursor movement amount setting means for setting a movement of a cursor indicated on said video display from said movement amount of a coordinate system input position; a cursor coordinate system memory means for indicating said cursor on said video display according to an initial cursor coordinate system data stored at the beginning of said coordinate system input operation and for storing a cursor coordinate system data of said cursor indicated on said video display at the end of said coordinate system input operation; and a cursor coordinate system setting means for setting new cursor coordinate system data from said cursor movement amount and said initial cursor coordinate system data and for indicating said cursor at a new position on said video display.

The first technical arrangement operates as follows.

A correction amount is calculated from a difference between the image coordinate system data of the test cursor indicated on the video display and a detected coordinate system data obtained from the coordinate system detection means upon a coordinate system input operation against the test cursor, and the correction amount is used to correct the detected coordinate system data to output the corrected data. Therefore, also when the coordinate system axes of the video display and the coordinate system detection means do not coincide with each other, the corrected and outputted coordinate system data coincides with the image coordinate system data.

The second technical arrangement operates as follows.

A movement amount of a coordinate system input position is calculated from a difference between the initial value of the detected coordinate system data obtained from the coordinate system detection means upon a coordinate system input operation and the detected coordinate system data obtained by moving the coordinate system input position, and the movement amount is used to determine the movement amount of the cursor with reference to the initial cursor coordinate system data. Therefore, the cursor is moved in response to a movement of the coordinate system input position other than the cursor, and it is not necessary to put a finger on the cursor during the coordinate system input operation. Further, it is possible to move the cursor by a large amount with a small movement of a finger, etc. if an appropriate relationship is established to move the cursor by a relatively large amount with a small movement amount of the coordinate system input position.

The third technical arrangement operates as follows.

A movement amount of a coordinate system input position is calculated from a difference between an initial value of the detected coordinate system data obtained from the coordinate system detection means upon a coordinate system input operation and a detected coordinate system data obtained by moving the coordinate system input position, and the movement amount is used to determine a movement amount of the cursor with reference to an initial cursor coordinate system data. Therefore, the cursor moves in response to the movement of the coordinate system input position other than the cursor, and it is not necessary to put a finger on the cursor during the coordinate system input operation. Further, the cursor may be moved by a larger amount than that of a finger, etc. if the movement amount of the cursor is appropriately proportioned with respect to the movement amount of the coordinate system input position. Additionally, since a procedure according to the cursor coordinate system data is commenced upon completion of the coordinate system input operation, the device is readily operated.

BRIEF DESCRIPTION OF THE DRAWINGS

FIG. 1 is a block diagram of a first embodiment of the invention;

FIG. 2 is a flow chart of the arrangement of FIG. 1;

DETAILED DESCRIPTION

Figure 3:
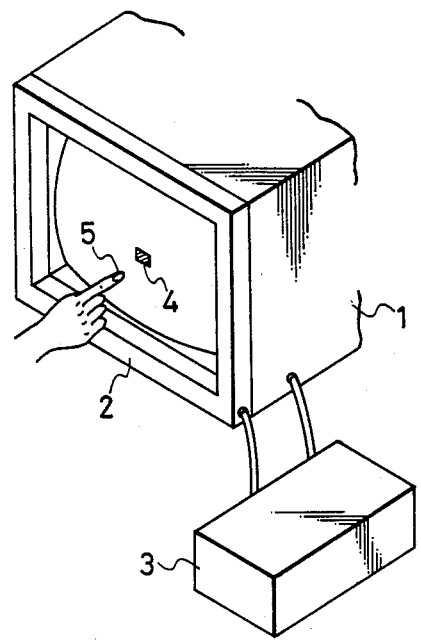
FIG. 3 is an exterior view of the device of FIG. 1.
Figure 4:
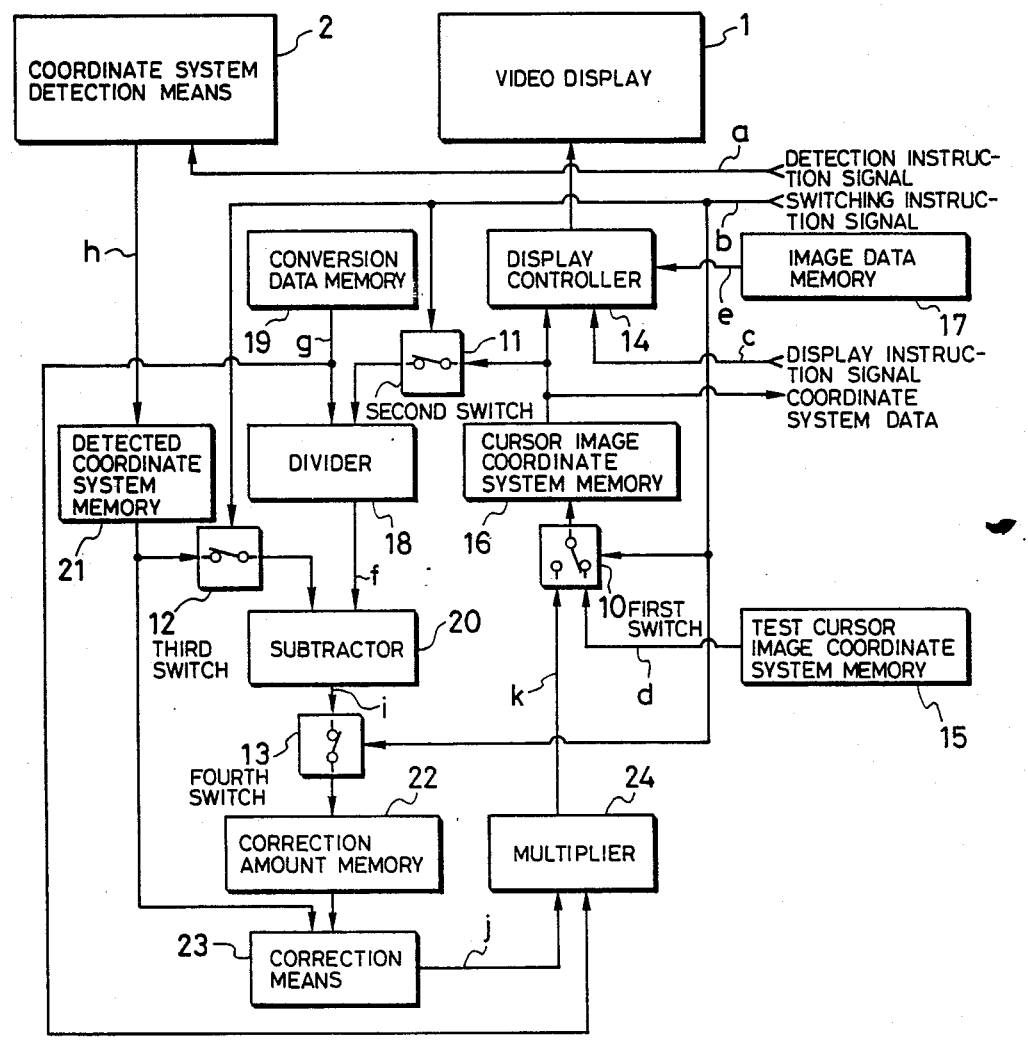
FIG. 4 is a block diagram showing details of the device of FIG. 1.

The invention is described below in detail, referring to a first embodiment illustrated in FIGS. 1 through 4. FIG. 1 is a block circuit diagram showing an arrangement of a coordinate system input device according to a first embodiment of the invention, FIG. 2 is a flow chart for explanation of an operation of the device of FIG. 1; FIG. 3 is an exterior view of the entire device, and FIG. 4 is a block diagram showing details of the arrangement of FIG. 1.

The coordinate system input device, as shown in FIG. 3, includes an optical coordinate system detection means 2 which consists of multiple pairs of light emitting elements and light receptor elements opposed to each other along front outer margins of a screen of a video display 1. A signal is supplied from a host computer 3 to indicate an image on the video display 1, and detected coordinate system data (or a detected data for calculation of the detected coordinate system data) is sent from the coordinate system detection means 2 to the host computer 3. Reference numeral 4 denotes a test cursor indicated on the video display 1, and 5 designates a finger which is put on the test cursor 4 to effect a coordinate system input operation.

As shown in FIG. 1, a test cursor indicating means 6 applies a signal to the video display 1 to have it display the cursor 4 thereon, and an image coordinate system data of the test cursor 4 is applied to a correction amount calculating means 7. Detected coordinate system data obtained from the coordinate system detection means 2 upon a coordinate system input operation by the finger 5 is applied to the correction amount calculating means 7 and to a correction means 8. The correction amount calculated by the correction amount calculating means 7 is applied to and stored in a correction amount memory means 9 and is applied to the correction means 8.

With this arrangement, when an operation of the coordinate system input device is commenced, the test cursor 4 is indicated on the video display 1 in response to a signal of the test cursor indicating means 6 (Step a of FIG. 2). The finger 5, etc. is put on the test cursor 4 on the video display 1 to effect a coordinate system input operation (Step b of FIG. 2). Responsively, the correction amount calculating means 7 calculates a correction amount from a difference between the detected coordinate system data obtained now from the coordinate system detection means 2 and the image coordinate system data of the test cursor (Step c of FIG. 2). The correction amount is stored in the memory means 9 (Step d of FIG. 2). After the correction amount is stored, writing in the correction amount memory means 9 is prohibited. Any detected data obtained from the coordinate system detection means 2 upon a coordinate system input operation after obtaining the correction amount is corrected by the correction means 8 based on the correction amount, and is outputted as coordinate system data (Step e of FIG. 2).

A detailed arrangement is explained below, referring to FIG. 4.

At the start of an operation of the coordinate system input device, the host computer 3 applies a detected instruction signal a to the coordinate system detection means 2, produces a switching instruction signal b to change first to fourth switching members 10 through 13 into conditions of FIG. 4, and applies a display instruction signal c to a display controller 14. In this fashion, an image coordinate system data d of the test cursor is sent from a test cursor image coordinate system memory 15 to a cursor image coordinate system memory 16 via a first switching member 10. The image coordinate system data d is applied to the display controller 14. An image data memory 17 applies an image data e to the display controller 14, and the test cursor 4 is indicated on the screen of the video display 1 in superposition on an image according to the image data e. The image coordinate system data d of the test cursor 4 applied to the display controller 14 is applied to a divider 18 via a second switching member 11. The divider 18 is supplied with a conversion data g from a conversion data memory 19 which conversion data g is used to convert the image coordinate system data d of coordinate system axes of the video display 1 into an image coordinate system data f of coordinate system axes of the coordinate system detection means 2. The image coordinate system data f whose coordinate axes are converted by the divider 18 is applied to a subtractor 20. Here, detected coordinate system data h obtained from the coordinate system detection means 2 upon a coordinate system input operation by putting the finger 5 on the test cursor 4 indicated on the video display 1 is applied to and stored in a detected coordinate system memory 21, and further applied to the substractor 20 via a third switching member 12. As a result, the subtractor 20 calculates and produces a correction amount i which represents a difference between the image coordinate system data f and the detected coordinate system data h. The correction amount i is applied to and stored in a correction amount memory 22 via a fourth switching member 13. After the correction amount i is stored in the correction amount memory 22, the first to fourth switching members 10 through 13 are changed to conditions (different from those in the illustration), and an initial setting is completed.

The detected coordinate system data h obtained from the coordinate system detection means 2 upon a subsequent coordinate system input operation is corrected by a correction means 23 by the correction amount i and applied to a multiplier 24 as a coordinate system data j. The multiplier 24 is supplied with the conversion data g from the conversion data memory 19, and the coordinate system data j of coordinate axes of the coordinate system detection means 2 is converted to a coordinate system data k of coordinate axes of the video display 1. The coordinate system data k is applied to the cursor image coordinate system memory 16 via the switching member 10 and stored in and outputted from the memory 16.

Therefore, also when the coordinate axes of the coordinate system detection means 2 are deviated from the video display 1, the position instructed by the coordinate system input operation is outputted as coordinate system data k of the coordinate axes of the video display 1.

The aforegoing description is directed to an arrangement configured to correct a deviation between coordinate axes of the video display 1 and coordinate system detection means 2 by putting the finger 5 on the test cursor 4. However, the invention coordinate system input device can be used in a mouse mode.

More specifically, if the finger 5 or other touching elements is put on a position other than the test cursor 4 indicated on the video display 1 to effect a coordinate system input operation at the beginning of an operation of the coordinate system input device, the device calculates and produces a correction amount i corresponding to a deviation between the position entered from the subtractor 20 and the test cursor 4, and sends the correction amount i to the correction amount memory 22. The detected coordinate system data h obtained from the coordinate system detection means 2 upon a subsequent coordinate system input operation is corrected into the coordinate system data j(k) deviating by the correction amount i and is outputteed thereafter. The position of the cursor 4 indicated on the video display 1 according to the coordinate system data k is deviated by the correction amount i from the position contacted by the finger 5 or other touching element, and the device operates in a mouse mode.

In such a mouse mode coordinate system input operation, the cursor is not hidden by the finger, etc., and this gives a user a clear view and facilitates a coordinate system input operation.

Except for the video display 1 and the coordinate system detection means 2, the coordinate system input device described above consists of software in the host computer 3. However, it may be formed of hardware. Further, the coordinate system detection means 2 is not limited to an optical type.

Figure 5:
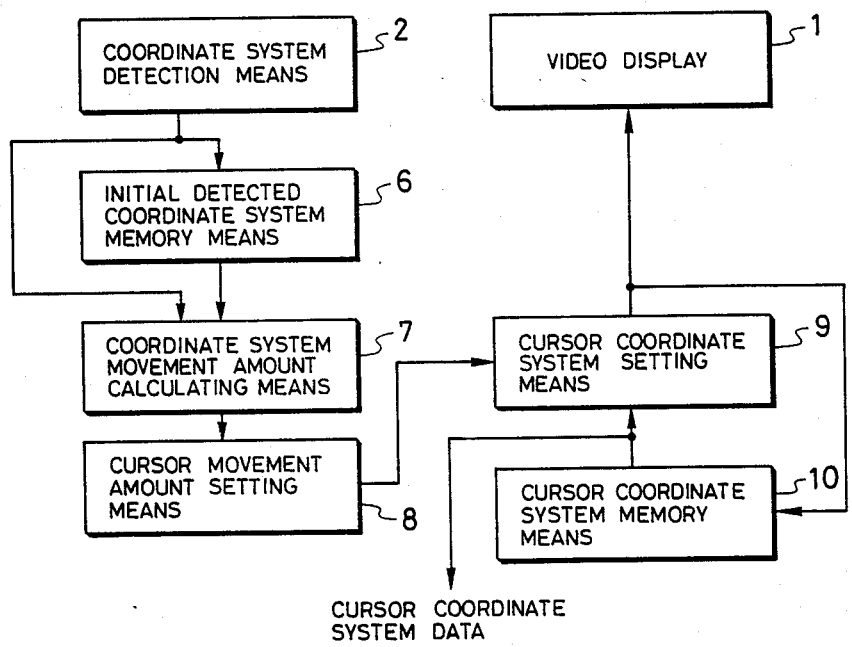
FIG. 5 is a block diagram of a second embodiment of the invention.
Figure 6:
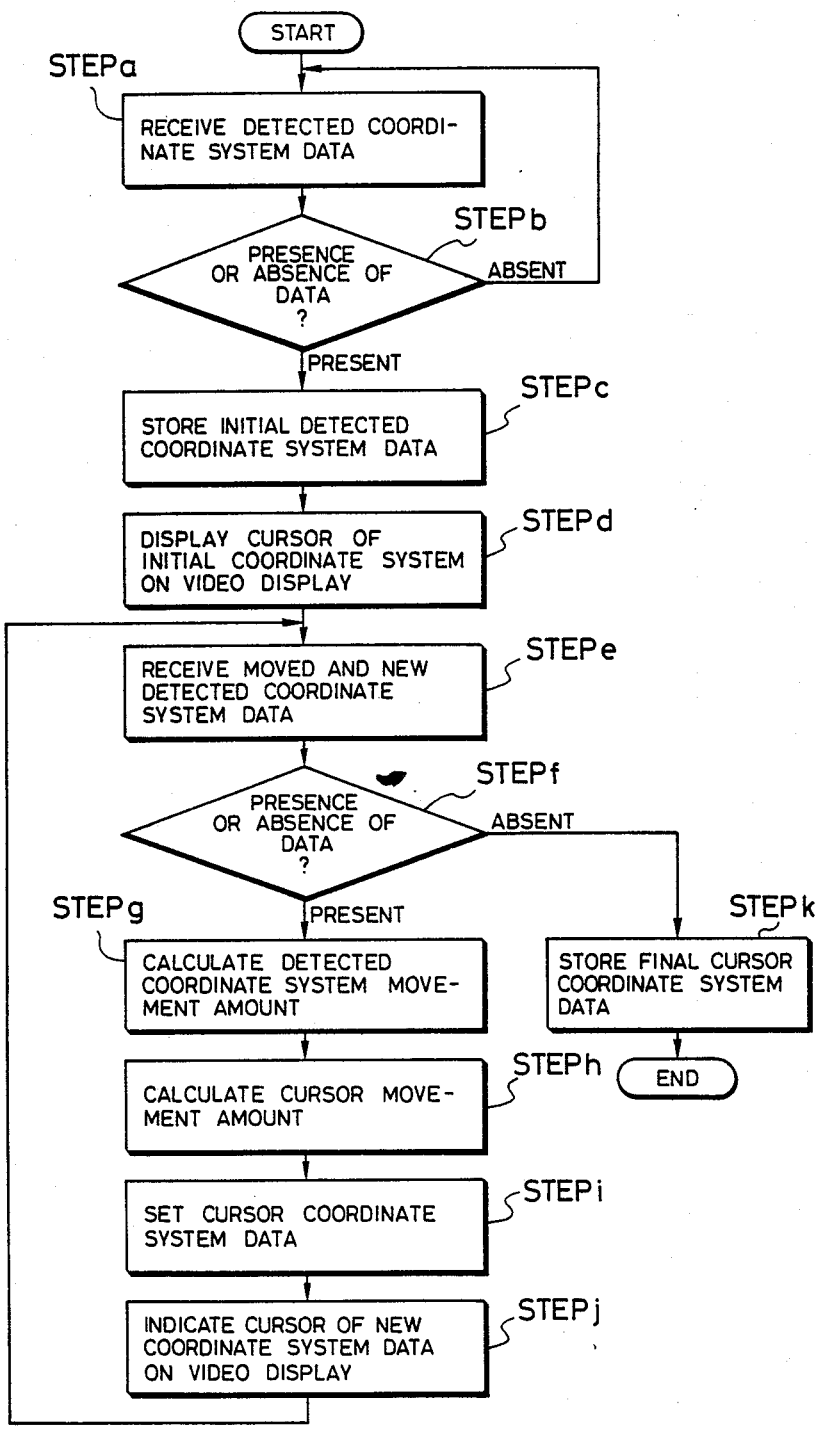
FIG. 6 is a flow chart of the arrangement of FIG. 5.
Figure 7:
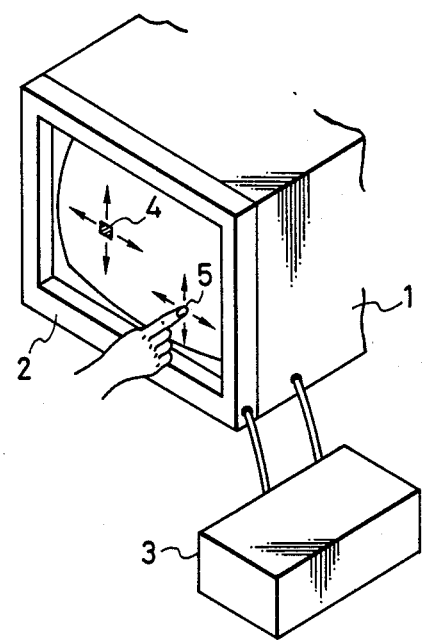
FIG. 7 is an exterior view of the devices of FIGS. 1 and 9.
Figure 8:
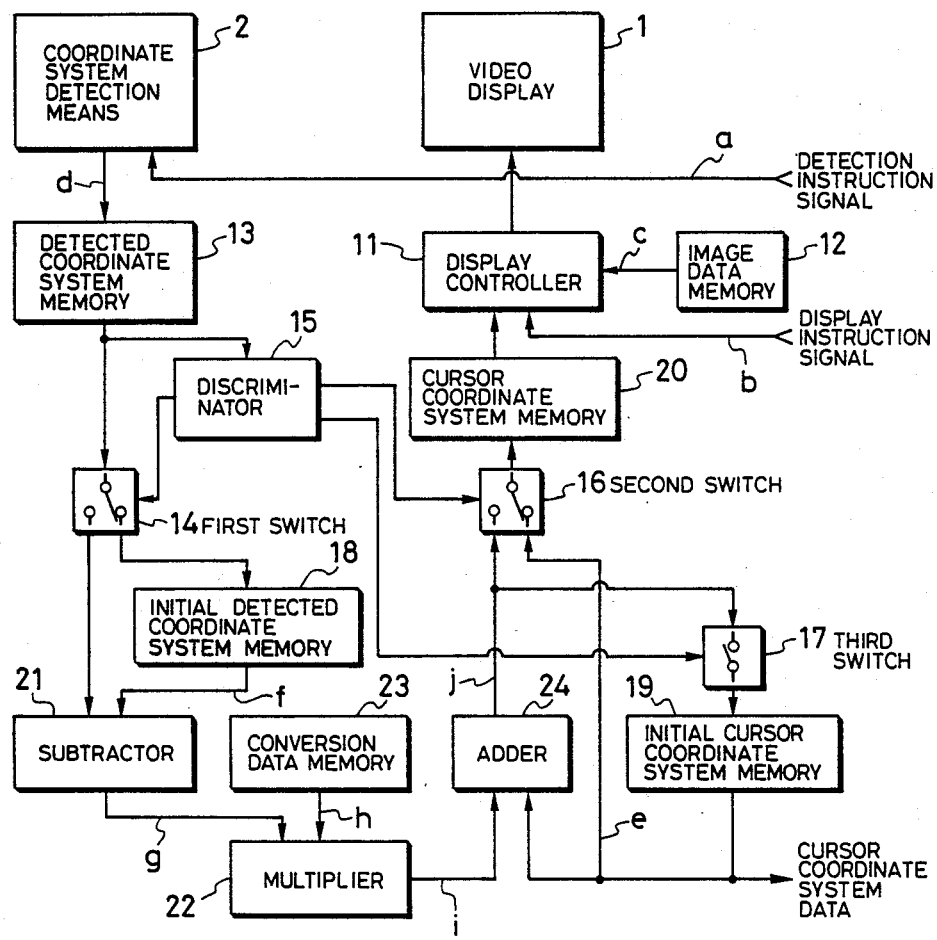
FIG. 8 is a block diagram showing details of the device of FIG. 5.

A second embodiment of the invention is described below, referring to FIG. 5 through 8. FIG. 5 is a block circuit diagram showing a coordinate system input device according to a second embodiment of the invention; FIG. 6 is a flow chart for explanation of an operation of the device of FIG. 5; FIG. 7 is an exterior view of the entire device, and FIG. 8 is a block diagram showing details of the arrangement of FIG. 5.

The coordinate system input device, as shown in FIG. 7, includes an optical coordinate system detection means 2 which consists of multiple pairs of light emitting elements and light receptor elements opposed to each other along front outer margins of a screen of a video display 1. A signal is supplied from a host computer 3 to indicate an image on the video display 1, and detected coordinate system data (or detected data for calculation of the detected coordinate system data) is sent from the coordinate system detection means 2 to the host computer 3. A cursor 4 is indicated on the video display 1, and a finger 5 is put on the screen other than the cursor 4 to effect a coordinate system input operation.

As shown in FIG. 5, the coordinate system input device is configured so that detected coordinate system data obtained from the coordinate system detection means 2 is applied to an initial detected coordinate system memory means 6 as an initial value, and the initial value is applied to a coordinate system movement amount calculating means 7. The coordinate system movement amount calculating means 7 is directly supplied with detected coordinate system data obtained by moving the coordinate system input position. A movement amount of the coordinate system input position calculated from the data applied to the calculating means 7 and the initial value is applied to a cursor movement amount setting means 8 and converted into a cursor movement amount which is applied to a cursor coordinate system setting means 9. Further, a cursor coordinate system memory means 10 gives the cursor coordinate system setting means 9 an initial cursor coordinate system data. A cursor coordinate system data outputted from the cursor coordinate system setting means 9 is applied to the video display 1 and to the cursor coordinate system memory means 10.

With this arrangement, when a coordinate system input operation is performed by putting the finger 5, etc. on the screen of the video display 1, the host computer 3 receives the detected coordinate system data obtained from the coordinate system detection means 2 (Step a of FIG. 6). The host computer 3 judges presence or absence of the detected coordinate system data (Step b of FIG. 6), and if the data is present, the initial detected coordinate system memory means 6 stores the initial value of the detected coordinate system data (Step c of FIG. 6). Responsively, the initial cursor coordinate system data originally stored in the cursor coordinate system memory means 10 is read out, and the cursor 4 is indicated on the screen of the video display 1 (Step d of FIG. 6). Here, the position of the indicated cursor 4 does not always coincide with the coordinate system input position instructed by the finger 5.

When the finger 5 is moved while contacting the screen of the video display 1, a new detected coordinate system data obtained from the coordinate system detection means 2 is received by the host computer 3 (Step e of FIG. 6). When presence of the data is recognized (Step f of FIG. 6), the coordinate system movement amount calculating means 7 calculates, from a difference between the new detected coordinate system data and the initial value, a movement amount of the coordinate system input position representing the length and the direction of the movement of the coordinate system input position (Step g of FIG. 6). The movement amount of the coordinate system input position is converted into a movement amount of the cursor by the cursor movement amount setting means 8 (Step h of FIG. 6). Here the cursor movement amount is converted so that the cursor movement distance is amplified with respect to the movement distance of the coordinate system input position. Further, the cursor movement amount is applied to the cursor coordinate system setting means 9 and added to the initial cursor coordinate system data to obtain a new cursor coordinate system data (Step i of FIG. 6) to thereby move and indicate the cursor 4 on a new coordinate system on the video display 1 (Step j of FIG. 6). While the finger 5 contacts the screen of the display 1 to continue the coordinate system input operation, steps 5 through 10 are repeated. Therefore, a mouse mode input operation is effected where the cursor 4 moves on the screen following to the movement of the finger 5 put on a position other than the cursor 4.

When the finger 5 is detached from the screen to finish the coordinate system input operation, the last cursor coordinate system data heretofore outputted from the cursor coordinate system setting means 9 is stored in the cursor coordinate system memory means 10 (Step k of FIG. 6), and the final cursor coordinate system data is outputted.

A detailed arrangement is described below, referring to FIG. 8.

At the beginning of an operation of the coordinate system input device, the host computer 3 gives the coordinate detection means 2 a detected instruction signal a, and gives a display controller 11 a display instruction signal b. Responsively, an image according to an image data c applied to the display controller 11 from an image data memory 12 is indicated on the display 1. Here, when a coordinate system input operation is effected by putting the finger 5 on the screen, a detected coordinate system data d from the coordinate system detection means 2 is stored in a detected coordinate system memory 13 and applied to a first switching element 14 and a discriminator 15. The discriminator 15 is used to judge presence or absence of the detected coordinate system data d to control first to third switching elements 14, 16 and 17. That is, the discriminator 15 temporarily changes the first and second switching elements 14 and 16 into configurations of FIG. 8 at the beginning of the coordinate system input operation, and temporarily changes the third switching element 17 into a configuration different from that of FIG. 8 at the end of the coordinate system input operation.

Due to the change of the first switching element 14, the initial value of the detected coordinate system data is applied to and stored in an initial detected coordinate system memory 18. Additionally, an initial cursor coordinate system data e originally stored in an initial cursor coordinate system memory 19 is applied to and stored in a cursor coordinate system memory 20 via the second switching element 16, and also applied to the display controller 11 to indicate the cursor 4 in superposition on the image of the image data c on the video display 1.

When the finger 5 is moved while contacting the screen, a new detected coordinate system data obtained from the coordinate system detection means 2 is applied to a subtractor 21 via the detected coordinate system memory 13 and via the first switching element 14. The subtractor 21 is supplied with an initial value f from the initial detected coordinate system memory 18. The subtractor 21 calculates a movement amount g corresponding to the movement distance and direction of the coordinate system input position from a difference between the new detected coordinate system data and the initial value f, and applies it to a multiplier 22. The multiplier 22 is supplied from a conversion data memory 23 with a conversion data h for setting a movement amount of the cursor 4 with respect to the movement amount g of the coordinate system input position. That is, the movement amount g of the cursor 4 is converted into a movement amount i and applied to an adder 24. The conversion data h is determined so that the movement distance of the input coordinate system position causes an amplified, identical or reduced movement of the cursor 4. The adder 24 adds the movement amount i of the cursor 4 to the initial cursor coordinate system data e from the initial cursor coordinate system memory 19, and the resulting cursor coordinate system data j is applied to the cursor coordinate system memory 20 via the second switching element 16. The same data j is also applied to the display controller 11 to move and indicate the cursor 4 at a new position of the screen of the video display 1.

In this fashion, since the cursor 4 moves in response to the movement amount of the coordinate system input position with reference to the initial cursor coordinate system data e, a mouse mode operation is performed.

When the finger 5 is detached from the screen to finish the coordinate system input operation, the discriminator 15 judges absence of the detected coordinate system data d and temporarily changes the third switching element 17 into a configuration different from FIG. 8. Due to this, the last cursor coordinate system data j just before the end of the coordinate system input operation is applied to and stored in the initial cursor coordinate system memory 19, and it is outputted thereafter when desired. Here, if a coordinate system input operation is done again, the cursor coordinate system data j stored in the initial cursor coordinate system memory 19 at the end of the preceding coordinate input operation is used as the initial cursor coordinate system data e.

Except for the video display 1 and the coordinate system detection means 2, the coordinate system input device described above consists of software of the host computer 3. However, it may instead be formed by hardware. Further, the coordinate system detection means 2 is not limited to an optical type. The aforegoing embodiment was described assuming that the coordinate axes of the video display 1 and of the coordinate system detection means 2 coincide with each other. However, if the coordinate axes are deviated or if their pitches are different, a coordinate system conversion means may be interposed between the subtracter 21 and the adder 24 to convert the movement amount g or i from the coordinate axes of the coordinate system detection means 2 into the coordinate axes of the video display 1. Further, the aforegoing embodiment is configured to effect a coordinate system input operation by putting the finger 5 on the screen of the video display 1. However, when an optical detection means is used, any member capable of blocking light paths may be used provided that it enables an adequate coordinate system input operation to obtain a detected coordinate system data.

Figure 9:
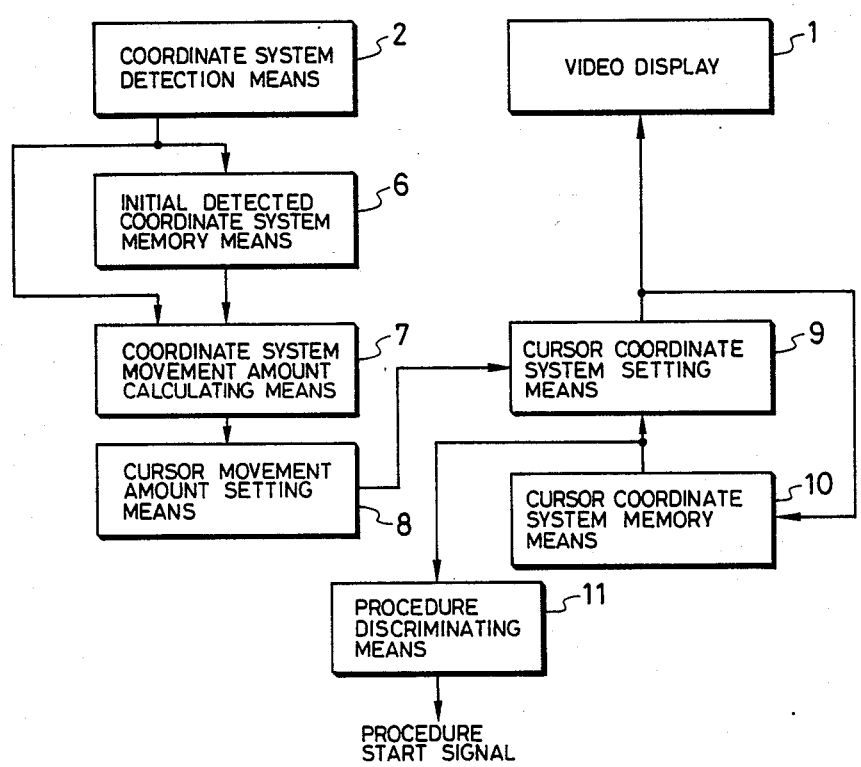
FIG. 9 is a block diagram of a third embodiment of the invention.
Figure 10:
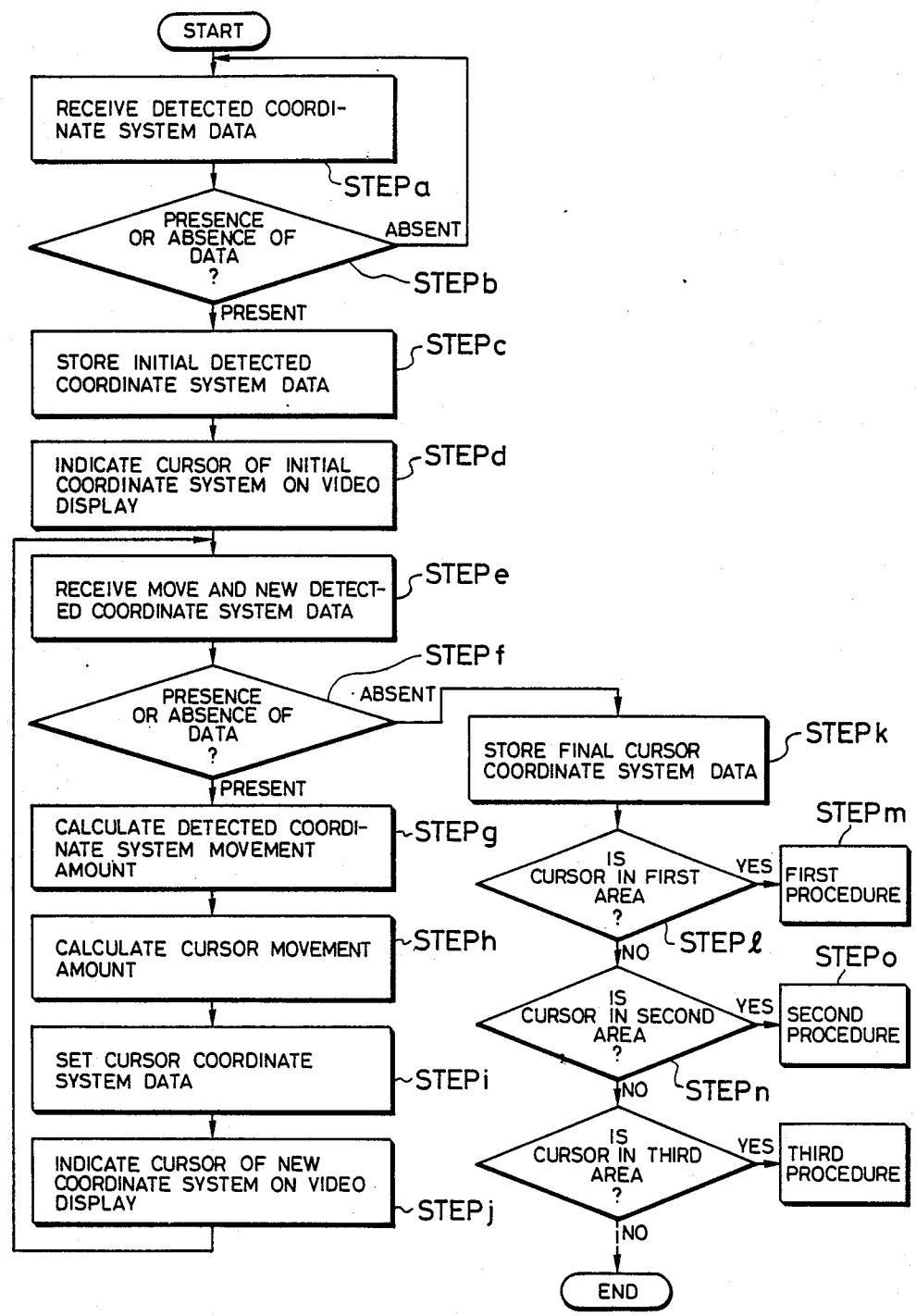
FIG. 10 is a flow chart of the arrangement of FIG. 9.
Figure 11:
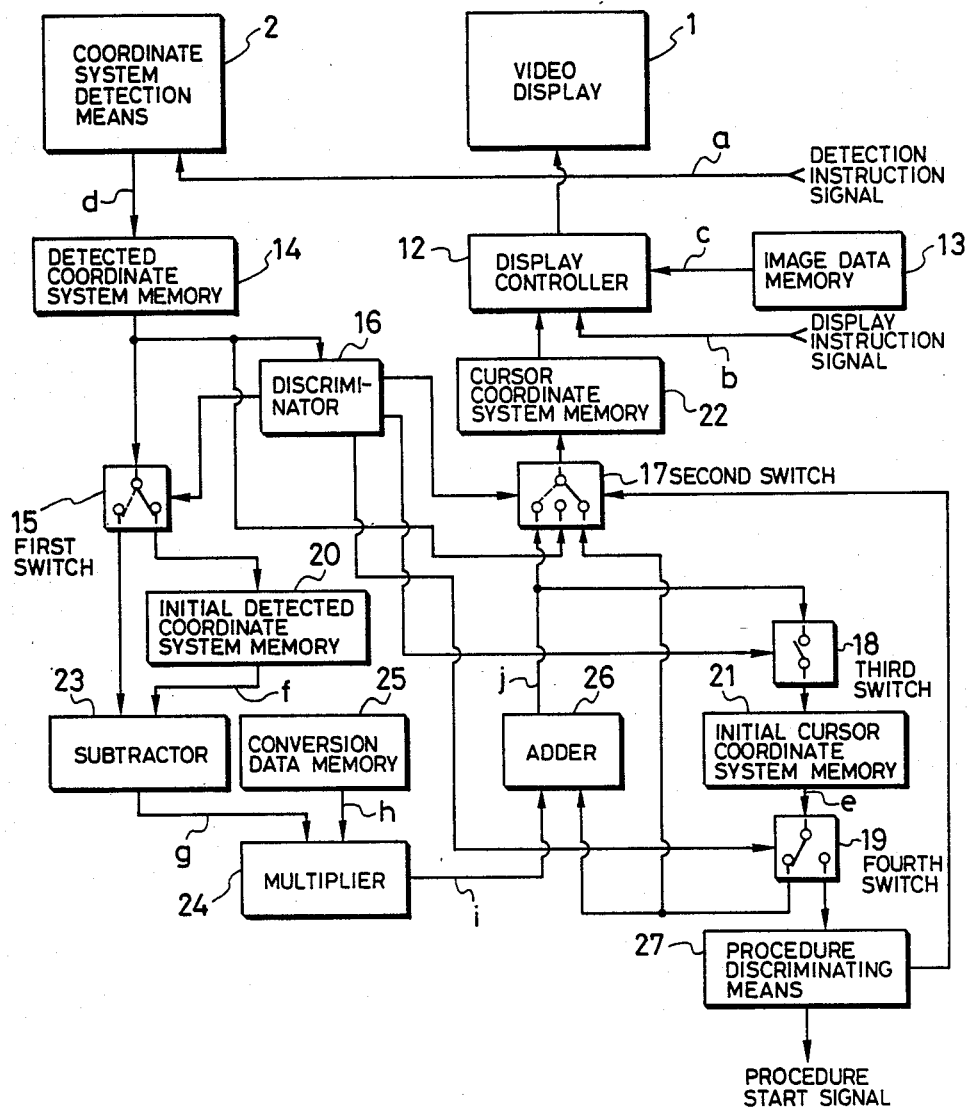
FIG. 11 is a block diagram showing details of the device of FIG. 9.

A third embodiment of the invention is described below, referring to FIG. 7 and FIGS. 9 through 11. FIG. 9 is a block circuit diagram showing a coordinate system input device according to a third embodiment of the invention; FIG. 10 is a flow chart for explanation of an operation of the device of FIG. 9; FIG. 7 is an exterior view of the entire device, and FIG. 11 is a block diagram showing details of the arrangement of FIG. 9.

The coordinate system input device, as shown in FIG. 7, includes an optical coordinate system detection means 2 which consists of multiple pairs of light emitting elements and light receptor elements opposed to each other along front outer margins of a screen of a video display 1. A signal is supplied from a host computer 3 to indicate an image on the video display 1, and detected coordinate system data (or a detected data for calculation of the detected coordinate system data) is sent from the coordinate system detection means 2 to the host computer 3. A cursor 4 is indicated on the video display 1, and a finger 5 is put on the screen other than the cursor 4 to effect a coordinate system input operation.

As shown in FIG. 9, the coordinate system input device is configured so that detected coordinate system data obtained from the coordinate system detection means 2 is applied to an initial detected coordinate system memory means 6 as an initial value, and the initial value is applied to a coordinate system movement amount calculating means 7. The coordinate system movement amount calculating means 7 is directly supplied with detected coordinate system data obtained by moving the coordinate system input position. A movement amount of the coordinate system input position calculated from the data applied to the calculating means 7 and the initial value is applied to a cursor movement amount setting means 8 and converted into a cursor movement amount which is applied to a cursor coordinate system setting means 9. Further, a cursor coordinate system memory means 10 gives the cursor coordinate system setting means 9 an initial cursor coordinate system data. A cursor coordinate system data outputted from the cursor coordinate system setting means 9 is applied to the video display 1 and to the cursor coordinate system memory means 10. Further, the cursor coordinate system data stored in the initial cursor cordinate system memory means 10 at the end of the coordinate system input operation is applied to a procedure discriminating means 11.

With this arrangement, when a coordinate system input operation is performed by putting the finger 5, etc. on the screen of the video display 1, the host computer 3 receives the detected coordinate system data obtained from the coordinate system detection means 2 (Step a of FIG. 10). The host computer 3 judges presence or absence of the detected coordinate system data (Step b of FIG. 10), and if the data is present, the initial detected coordinate system memory means 6 stores the initial value of the detected coordinate system data (Step c of FIG. 10). Responsively, the initial cursor coordinate system data originally stored in the cursor coordinate system memory means 10 is read out, and the cursor 4 is indicated on the screen of the video display 1 (Step d of FIG. 10). Here, the position of the indicated cursor 4 does not always coincide with the coordinate system input position instructed by the finger 5.

When the finger 5 is moved while contacting the screen of the video display 1, a new detected coordinate system data obtained from the coordinate system detection means 2 is received by the host computer 3 (Step e of FIG. 10). When presence of the data is recognized (Step f of FIG. 10), the coordinate system movement amount calculating means 7 calculates, from a difference between the new detected coordinate system data and the initial value, a movement amount of the coordinate system input position representing the length and the direction of the movement of the coordinate system input position (Step g of FIG. 10). The movement amount of the coordinate system inut position is converted into a movement amount of the cursor by the cursor movement amount setting means 8 (Step h of FIG. 10). Here the cursor movement amount is converted so that the cursor movement distance is amplified with respect to the movement distance of the coordinate system input position. Further, the cursor movement amount is applied to the cursor coordinate system setting means 9 and added to the initial cursor coordinate system data to obtain a new cursor coordinate system data (Step i of FIG. 10) to thereby move and indicate the cursor 4 on a new coordinate system on the video display 1 (Step j of FIG. 10). While the finger 5 contacts the screen of the display 1 to continued the coordinate system input operation, steps 5 through 10 are repeated. Therefore, a mouse mode input operation is effected where the cursor 4 moves on the screen following to the movement of the finger 5 put on a position other than the cursor 4.

When the finger 5 is detached from the screen to finish the coordinate system input operation, the last cursor coordinate system data heretofore outputted from the cursor coordinate system setting means 9 is stored in the cursor coordinate system memory means 10 (Step R of FIG. 10). Further, the final cursor coordinate system data stored in the cursor coordinate system memory means 10 is applied to the procedure discriminating means 11 to have it judge presence or absence of the cursor in a first area from the cursor coordinate system data (Step L of FIG. 10). If the cursor is present in the first area, a first procedure of another program of the host computer 3 is commenced (Step M of FIG. 10). If the cursor coordinate system data shows that the cursor is not present in the first area, it is confirmed whether it is present in a second area or not (Step N of FIG. 10). If the cursor is present in the second area, a second procedure is commenced (Step O of FIG. 10). If the cursor is not present in the second area, similar confirmation is repeated until presence of the cursor in any area is recognized. However, such a procedure is terminated if the cursor is not present in any area.

A detailed arrangement is described below, referring to FIG. 11.

At the beginning of an operation of the coordinate system input device, the host computer 3 gives the coordinate detection means 2 a detected instruction signal a, and gives a display controller 12 a display instruction signal b. Responsively, an image according to an image data c applied to the display controller 12 from an image data memory 13 is indicated on the display 1. Here, when a coordinate system input operation is effected by putting the finger 5 on the screen, a detected coordinate system data d from the coordinate system detection means 2 is stored in a detected coordinate system memory 14 and applied to a first switching element 15 and a discriminator 16. The discrimanator 16 is used to judge presence or absence of the detected coordinate system data d to control first to fourth switching elements 15, 17, 18 and 19. That is, the discriminator 16 temporarily changes the first and second switching elements 15 and 17 into positions shown by solid lines in FIG. 11 at the beginning of the coordinate system input operation, and temporarily changes the third and fourth switching elements 18 and 19 into positions different from those of FIG. 11 at the end of the coordinate system input operation.

Due to the change of the first switching element 15, the initial value of the detected coordinate system data d is applied to and stored in an initial detected coordinate system memory 20. Additionally, an initial cursor coordinate system data e originally stored in an initial cursor coordinate system memory 21 is applied to and stored in a cursor cordinate system memory 22 via the fourth and second switching elements 19 and 17, and also applied to the display controller 12 to indicate the cursor 4 in superposition on the image of the image data c on the video display 1.

When the finger 5 is moved while contacting the screen, a new detected coordinate system data d obtained from the coordinate system detection means 2 is applied to a subtractor 23 via the detected coordinate system memory 14 and via the first switching element 15. The subtractor 23 is supplied with an initial value f from the initial detected coordinate system memory 20. The subtractor 23 calculates a movement amount g corresponding to the movement distance and direction of the coordinate system input position from a difference between the new detected coordinate system data and the initial value f, and applies it to a multiplier 24. The multiplier 24 is supplied from a conversion data memory 25 with a conversion data h for setting a movement amount of the cursor 4 with respect to the movement amount g of the coordinate system input position. That is, the movement amount g of the cursor 4 is converted into a movement amount i and applied to an adder 26. The conversion data h is determined so that the movement distance of the input coordinate system position causes an amplified, identical or reduced movement of the cursor 4. The adder 26 adds the movement amount i of the cursor 4 to the initial cursor coordinate system data e from the initial cursor coordinate system memory 21, and a resulting cursor coordinate system data j is applied to the cursor coordinate system memory 22 via the second switching element 17. The same data j is also applied to the display controller 12 to move and indicate the cursor 4 at a new position of the screen of the video display 1.

In this fashion, since the cursor 4 moves in response to the movement amount of the coordinate system input position with reference to the initial cursor coordinate system data e, a mouse mode operation is performed.

When the finger 5 is detached from the screen to finish the coordinate system input operation, the discriminator 16 judges absence of the detected coordinate system data d and temporarily changes the third and fourth switching elements 18 and 19 into positions different from those of FIG. 11. Due to this, the last cursor coordinate system data j just before the end of the coordinate system input operation is applied to and stored in the initial cursor coordinate system memory 21, and also applied to the procedure discriminating means 27. The procedure discriminating means 27 discriminates an area where the cursor 4 according to the final cursor coordinate system data j is located, and produces a signal responsive to the area to commence a predetermined procedure of another program of the host computer 3. Further, when the final position of the cursor 4 is located in a predetermined area, the procedure discriminating means 27 gives a signal to the second switching element 17 to change it into a position other than the solid and dotted lines of FIG. 11, gives the cursor coordinate system memory 22 the final detected coordinate system data d stored in the detected coordinate system memory 14 to have the memory 22 store the data d, and causes the display controller 12 to indicate the cursor 4 at the coordinate system input position on the screen finally instructed b the finger 5. Here, if a coordinate system input operation is done again, the cursor coordinate system data j stored in the initial cursor coordinate system memory 21 at the end of the preceding coordinate input operation is used as the initial cursor coordinate system data e.

Except the video display 1 and the coordinate system detection means 2, the coordinate system input device described above consists of software of the host computer 3. However, it may be formed by hardware. The aforegoing embodiment was described assuming that the coordinate axes of the video display 1 and those of the coordinate system detection means 2 coincide with each other. However, if the coordinate axes are deviated or if their pitches are different, a coordinate system conversion means may be interposed between the subtracter 23 and the adder 26 to convert the movement amount g or i from the coordinate axes of the coordinate system detection means 2 into the coordinate axes of the video display 1. Further, the aforegoing embodiment is configured to effect a coordinate system input operation by putting the finger 5 on the screen of the video display 1. However, when an optical detection means is used, any member capable of blocking light paths may be used provided that it enables an adequate coordinate system input operation to obtain detected coordinate system data.

As described above, the coordinate system input device using the first technical arrangement is configured to output the detected coordinate system data after correction when the axes of the coordinate system detection means and the coordinate axes of the video display do not coincide with eath other. Therefore, it does not require a severe positional accuracy in the position of the coordinate system detection means with respect to the video display, and hence facilitates the manufacturing process. Further, it is possible to use a mouse mode to input a coordinate system data.

The coordinate system input device using the second technical arrangement is configured to move the cursor indicated on the video display in a mouse mode. Therefore, it is prevented that a finger or other direct touching element hides the cursor during coordinate system input operation. Further, the cursor movement amount on the screen can be amplified or reduced with respect to the movement amount of a finger, etc. for a coordinate system input operation, considering the size of the screen of the video display, so as to facilitate the coordinate system input operation.

The coordinate system input device using the third technical arrangement is configured to move the cursor indicated on the video display in a mouse mode. Therefore, it is prevented that a finger or other direct touching element hides the cursor during coordinate system input operation. Further, the cursor movement amount on the screen can be amplified or reduced with respect to the movement amount of a finger, etc. for a coordinate system input operation, considering the size of the screen of the video display, so as to facilitate the coordinate system input operation. Additionally, since another program of the host computer corresponding to the position of the cursor is commenced based on the final cursor coordinate system data at the end of a coordinate system input operation, the invention device simplifies operation thereof and does not cause operation errors.

What is claimed is:

1. A coordinate system input device comprising:
   a display apparatus having a display screen;
   a coordinate system detector disposed on a front surface of said display screen to detect a coordinate position of an object adjacent to said front surface of said display screen and to output detected coordinate system data corresponding to said position of said object;
   an initial detected coordinate system memory means for storing an initial value of said detected coordinate system data obtained from said coordinate system detector;
   a coordinate movement amount calculating means for calculating a movement amount of said object, as said object is being moved across said front surface, referenced to said initial value of said detected coordinate system data stored in said initial detected coordinate system memory means, said coordinate movement amount calculating means calculating said movement amount by comparing said initial value with new detected coordinate system data;
   a cursor movement amount setting means for setting a movement amount of a cursor displayed on said display screen in response to an output of said coordinate movement amount calculating means;
   a cursor coordinate system setting means for outputting data to said display apparatus indicating a cursor position in response to an output of said cursor movement amount setting means and said initial value stored in said initial detected coordinate system memory means; and
   a cursor coordinate system memory means for storing an output of said cursor coordinate system setting means corresponding to a cursor position of said cursor displayed by said display apparatus when said object adjacent to said front surface of said display screen is removed.

2. The coordinate system input device of claim 1 wherein said cursor movement amount setting means amplifies said movement amount of said object so that a movement of said object adjacent said front surface of said display screen results in a proportional movement of said cursor displayed on said display screen.

3. A coordinate system input device of claim 2 further comprising a procedure discriminating means for producing a procedure initiating signal for automatically executing a procedure dictated by the position of said cursor when said object adjacent to said front surface of said display screen is removed.

4. A coordinate system input device comprising:
a display apparatus having a display screen;
a coordinate system detector disposed on a front surface of said display screen to detect a coordinate position of an object adjacent to said front surface of said display screen and to output detected coordinate system data corresponding to said position of said object;
an initial detected coordinate system memory means for storing an initial value of said detected coordinate system data obtained from said coordinate system detector;
a coordinate movement amount calculating means for calculating a movement amount of said object, as said object is being moved across said front surface, referenced to said initial value of said detected coordinate system data stored in said initial detected coordinate system memory means, said coordinate movement amount calculating means calculating said movement amount by comparing said initial value with new detected coordinate system data;
a cursor movement amount setting means for setting a movement amount of a cursor displayed on said display screen in response to an output of said coordinate movement amount calculating means, wherein said cursor movement amount setting means amplifies said movement amount of said object so that a movement of said object adjacent said front surface of said display screen results in a proportional movement of said cursor displayed on said display screen;
a cursor coordinate system setting means for outputting data to said display apparatus indicating a cursor position in response to an output of said cursor movement amount setting means and said initial value stored in said initial detected coordinate system memory means;
a cursor coordinate system memory means for storing an output of said cursor coordinate system setting means corresponding to a cursor position of said cursor displayed by said display apparatus when said object adjacent to said front surface of said display screen is removed;
a discriminator connected to receive said detected coordinate system data from said coordinate system detector for judging presence or absence of the detected coordinate system data and having a first output; and
a first switching element responsive to said first output of said discriminator and connected to said initial detected coordinate system memory means to allow storage of said initial value of said detected coordinate system data.

5. A coordinate system input device of claim 4 further comprising:
a procedure discriminating means for producing a procedure initiating signal for automatically executing a procedure dictated by the position of said cursor when said object adjacent to said front surface of said display screen is removed; and
a second switching element for providing an output of said cursor coordinate system memory means to said procedure discriminating means in response to said discriminator when said object or said front surface on said display screen is removed.

* * * * *